June 12, 1928.  J. VOM HOFE  1,673,382
FISHING REEL
Filed April 22, 1927
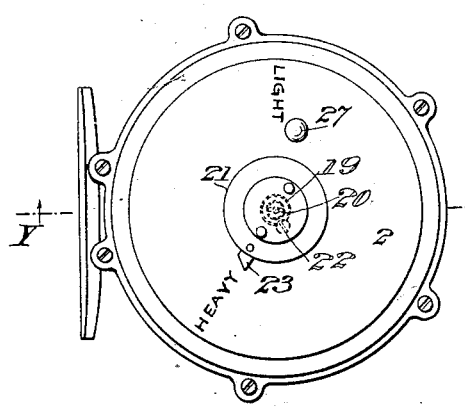
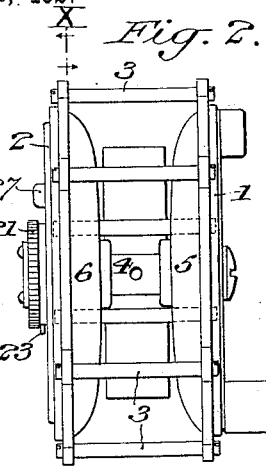
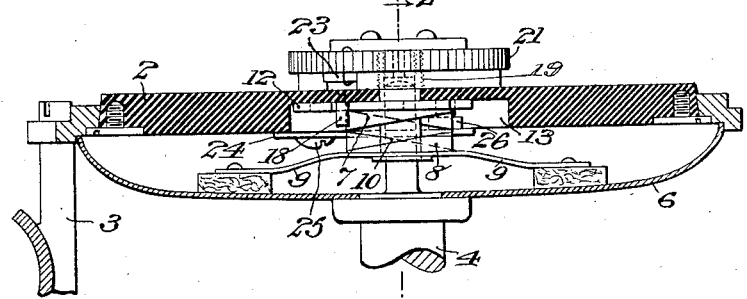
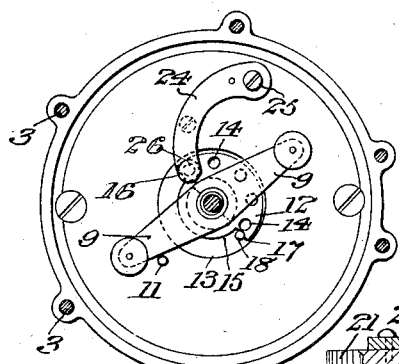
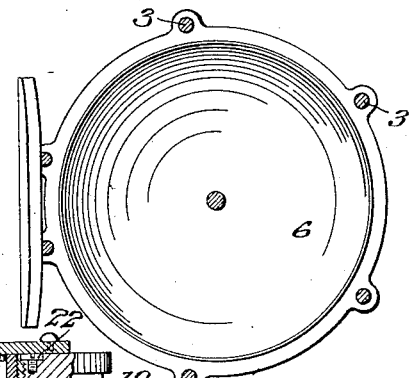
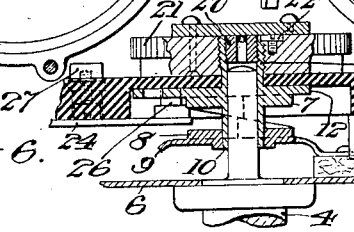
INVENTOR
Julius vom Hofe
BY
Brown Seward
ATTORNEYS Patented June 12, 1928.                                                          1,673,382

UNITED STATES PATENT OFFICE.

JULIUS vom HOFE, OF BROOKLYN, NEW YORK, ASSIGNOR TO THOMAS B. MILLS, OF NEW YORK, N. Y., TRADING UNDER NAME OF WILLIAM MILLS & SONS.

FISHING REEL.

Application filed April 22, 1927. Serial No. 185,831.

The object of my invention is to provide a fishing reel having novel features of construction whereby the operation and adjustment of the spool tension device is materially facilitated when the reel is in use by placing the tension device at the rear head of the reel instead of at the front head as heretofore, where its operation was handicapped by the location of the handle. Another novel feature is the location of the locking disc of the tension device where it is fully protected and whereby access to the tension device may be obtained without disturbing the spool winding mechanism and the construction of the reel is simplified and its cost of manufacture materially decreased.

A practical embodiment of my invention is represented in the accompanying drawings, in which Fig. 1 represents a back view of the reel.

Fig. 2 represents a side view of the same.

Fig. 3 represents a section taken in the plane of the line X—X of Fig. 2, looking toward the left.

Fig. 4 represents a section taken on the same line, looking toward the right.

Fig. 5 represents an enlarged detail section taken in the plane of the line Y—Y of Fig. 1, looking in the direction of the arrows.

Fig. 6 represents a section taken in the plane of the line Z—Z of Fig. 5, looking in the direction of the arrows.

The front and rear heads of the reel are denoted by 1 and 2, which heads are connected and spaced apart by the usual rods 3. The axle 4 of the spool is rotatably mounted in the front and rear heads and it has the usual front and rear flanges 5 and 6.

The tension device is located between the rear head 2 of the reel and the rear flange 6 of the spool and comprises the usual coacting cams 7 and 8, each having two semi-circular cam surfaces, and the flat spring 9 carried by the cam 8, the free ends of which spring in the present instance frictionally engage the rear flange 6 of the spool rather than the front flange, as heretofore. The cam 8 which carries the friction spring 9 is mounted on the inwardly projecting sleeve 10 of the cam 7. A pin 11 projecting from the inner face of the rear head 2 of the reel serves to limit the rotative movement of the cam 8 and friction spring 9.

The device for adjusting the tension of the friction spring 9 and for locking the spring in its adjusted position is constructed, arranged and operated as follows:

The cam 7 is provided with an inside disc 12 located within a central recess 13 formed in the inner face of the rear head 2 of the reel, which disc has a series of holes 14 arranged about half way around the disc and concentric with the spool axle 4. The rotative movement of this disc and its cam 7 is limited in both directions from "heavy" to "light" tension of the spring 9 by providing the portion of the disc opposite the series of holes 14 with a semi-circular recess 15 forming at its ends shoulders 16 and 17 in position to engage a pin 18 projecting from the bottom of the recess 13.

The cam 7 is further provided with an outwardly projecting sleeve 19 interiorly screw-threaded to receive a screw plug 20 and exteriorly screw-threaded to receive the outer operating disc 21, which outer disc is used for turning the inner locking disc 12 and cam 7 to adjust the tension of the spring 9 through the coaction of the cams 7 and 8. This outer operating disc 21 is screwed onto the hollow sleeve 19 and held in position by a set screw 22. This disc 21 may be provided with a pointer 23 projecting from its periphery, arranged to indicate the adjusted tension of the friction spring 9 by its relative position with respect to the legends "Heavy" and "Light" placed on the outer face of the reel rear head 2.

One end of a flat locking spring 24 is secured at 25 to the inner face of the rear head 2 of the reel, the free end of which spring is provided with a projection 26, arranged to normally enter one of the series of holes 14 in the inner disc 12 to lock the parts in their adjusted position. A push pin 27 engages the locking spring 24 and projects through the outer face of the rear head 2 of the reel in position to be depressed to release the spring from its engagement with the locking disc 12 when it is desired to change the tension of the spring 9.

From the above description it will be seen that in the first place I have provided the tension device at the back of the reel so that its adjusting means may be manipulated while the reel is in use and without interfering with the handle at the front of the reel. In the second place it will be seen that I have provided means whereby the locking disc which coacts with the locking spring is mounted inside the reel instead of outside thereof, thereby effectually protecting the disc. In the third place it will be seen that the construction of the reel is materially simplified and that access may be readily obtained to the parts of the tension device without disturbing the winding mechanism at the front of the reel.

It is evident that various changes may be resorted to in the construction, form and arrangement of the several parts without departing from the spirit and scope of my invention; hence, I do not intend to be limited to the particular embodiment herein shown and described, but

What I claim is:—

1. In a fishing reel, the connected front and rear heads, the spool with its front and rear flanges, and an adjustable friction device carried by the reel rear head and engaging the spool rear flange, said device comprising coacting cams, a friction spring carried by one of the cams, and locking and operating discs carried by the other cam inside and outside respectively of the rear head of the reel.

2. In a fishing reel, the connected front and rear heads, the spool with its front and rear flanges, and an adjustable friction device carried by the reel rear head and engaging the spool rear flange, said device comprising coacting cams, a friction spring carried by one of the cams, locking and operating discs carried by the other cam inside and outside respectively of the rear head of the reel, and a locking spring engaging the locking disc for securing the parts in their adjusted position.

3. In a fishing reel, the connected front and rear heads, the spool with its front and rear flanges, and an adjustable friction device carried by the reel rear head and engaging the spool rear flange, said device comprising coacting cams, a friction spring carried by one of the cams, locking and operating discs carried by the other cam inside and outside respectively of the rear head of the reel, a locking spring engaging the locking disc for securing the parts in their adjusted position, and means carried by the reel rear head for releasing the locking spring from its engagement with the locking disc.

4. In a fishing reel, the connected front and rear heads, the spool with its front and rear flanges, and an adjustable friction device carried by the reel rear head and engaging the spool rear flange, said device comprising coacting cams, a friction spring carried by one of the cams, locking and operating discs carried by the other cam inside and outside respectively of the rear head of the reel, a locking spring engaging the locking disc for securing the parts in their adjusted position, means carried by the reel rear head for releasing the locking spring from its engagement with the locking disc, and means for limiting the rotative movement of the locking disc.

5. In a fishing reel, the connected front and rear heads, the spool with its front and rear flanges, and an adjustable friction device carried by the reel rear head and engaging the spool rear flange, said device comprising coacting cams, a friction spring carried by one of the cams, locking and operating discs carried by the other cam inside and outside respectively of the rear head of the reel, a locking spring engaging the locking disc for securing the parts in their adjusted position, means carried by the reel rear head for releasing the locking spring from its engagement with the locking disc, and means for limiting the rotative movement of the locking disc comprising a pin projecting from the inner face of the rear head and shoulders on the locking disc arranged to engage said pin.

6. In a fishing reel, the connected front and rear heads, the spool with its front and rear flanges, and an adjustable friction device carried by the reel rear head and engaging the spool rear flange, said device comprising coacting cams, a friction spring carried by one of the cams, locking and operating discs carried by the other cam inside and outside respectively of the rear head of the reel, a locking spring engaging the locking disc for securing the parts in their adjusted position, means carried by the reel rear head for releasing the locking spring from its engagement with the locking disc, means for limiting the rotative movement of the locking disc, and means carried by the reel rear head for limiting the rotative movement of the friction spring.

7. In a fishing reel, the connected front and rear heads, the spool with its front and rear flanges, and an adjustable friction device carried by the reel rear head and engaging the spool rear flange, said device comprising coacting cams, a friction spring carried by one of the cams, locking and operating discs carried by the other cam inside and outside respectively of the rear head of the reel, a locking spring engaging the locking disc for securing the parts in their adjusted position, means carried by the reel rear head for releasing the locking spring from its engagement with the locking disc, means for limiting the rotative movement of the lock-in disc, and means carried by the reel rear head for limiting the rotative movement of the friction spring comprising a pin projecting from the inner face of the rear head into position to engage the friction spring.

8. In a fishing reel, the connected front and rear heads, the spool with its front and rear flanges, an adjustable device carried by the reel rear head and engaging the spool rear flange, said device comprising coacting cams, a friction spring carried by one of the cams, and locking and operating discs carried by the other cam inside and outside respectively of the reel rear head, the outer face of the rear head having marks thereon to indicate the limits of the rotative movement of the friction device, and a pointer carried by the operating disc arranged to coact with said marks.

9. In a fishing reel, the connected front and rear heads, the spool with its front and rear flanges and an adjustable friction device carried by the reel rear head and engaging the spool rear flange, said device comprising coacting cams, a friction spring carried by one of the cams, and locking and operating discs carried by the other cam inside and outside respectively of the reel rear head, said rear head having a central recess within which the locking disc and its cam are located.

10. In a fishing reel, the connected front and rear heads, the spool with its front and rear flanges and an adjustable friction device carried by the reel rear head, said device comprising two coacting cams, one cam having inwardly and outwardly projecting sleeves, a locking disc carried thereby inside the reel rear head, and an operating disc carried by said outwardly projecting sleeve outside the reel rear head, the other cam being mounted on the inwardly projecting sleeve, and a tension spring carried by said last named cam in engagement with the spool rear flange.

In testimony, that I claim the foregoing as my invention, I have signed my name this 20th day of April, 1927.

JULIUS vom HOFE.